United States Patent
Rouille

(10) Patent No.: US 8,715,087 B2
(45) Date of Patent: May 6, 2014

(54) VIDEO GAME INCLUDING USER DETERMINED LOCATION INFORMATION

(76) Inventor: David W. Rouille, Maynard, MA (US)

( * ) Notice: Subject to any disclaimer, the term of this patent is extended or adjusted under 35 U.S.C. 154(b) by 59 days.

(21) Appl. No.: 13/438,999

(22) Filed: Apr. 4, 2012

(65) Prior Publication Data
US 2012/0264518 A1 Oct. 18, 2012

Related U.S. Application Data

(60) Provisional application No. 61/474,594, filed on Apr. 12, 2011.

(51) Int. Cl.
*A63F 9/24* (2006.01)
(52) U.S. Cl.
USPC ................................ 463/42; 463/31; 345/632
(58) Field of Classification Search
CPC .............. A63F 13/12; A63F 2300/205; A63F 2300/402; A63F 2300/406; A63F 2300/807; A63F 2300/8082; G06T 15/005; G06T 19/006
USPC .......................... 463/40–42, 31; 345/629, 632
See application file for complete search history.

(56) References Cited

U.S. PATENT DOCUMENTS

| | | | |
|---|---|---|---|
| 2002/0090985 A1* | 7/2002 | Tochner et al. | 463/1 |
| 2003/0037156 A1* | 2/2003 | Mallart | 709/231 |
| 2004/0058732 A1* | 3/2004 | Piccionelli | 463/42 |
| 2005/0043097 A1* | 2/2005 | March et al. | 463/42 |
| 2006/0223635 A1* | 10/2006 | Rosenberg | 463/37 |
| 2008/0146338 A1* | 6/2008 | Bernard et al. | 463/42 |
| 2010/0017722 A1* | 1/2010 | Cohen | 715/740 |
| 2010/0062818 A1* | 3/2010 | Haughay et al. | 463/7 |
| 2010/0298050 A1* | 11/2010 | Taraschuk et al. | 463/31 |
| 2012/0142415 A1* | 6/2012 | Lindsay | 463/33 |
| 2012/0206322 A1* | 8/2012 | Osterhout et al. | 345/8 |

* cited by examiner

Primary Examiner — Damon Pierce

(57) ABSTRACT

A method, apparatus and computer program product for a video game including user determined location information is presented. Location information (e.g. GPS, Google Maps, an entered address or the like) determined by a user of a video game is acquired. Then user determined location information relating to a physical location determined by the user is mapped to a video game environment wherein the user of the video game experiences objects from the users entered location while playing the video game.

20 Claims, 3 Drawing Sheets

VIDEO GAME INCLUDING USER DETERMINED LOCATION INFORMATION

RELATED APPLICATIONS

The present application claims the benefit of U.S. Provisional Patent Application No. 61/474,594 filed on Apr. 12, 2011, which is incorporated herein by reference in its entirety.

BACKGROUND

Video games have become ubiquitous. A video game is an electronic game that involves interaction with a user interface to generate visual feedback on a video device. The word video in video game traditionally referred to a raster display device. However, with the popular use of the term "video game", it now implies any type of display device. The electronic systems used to play video games are known as platforms; examples of these are personal computers and video game consoles. These platforms range from large mainframe computers to small handheld devices. Specialized video games such as arcade games, while previously common, have gradually declined in use.

The input device used to manipulate video games is called a game controller, and varies across platforms. For example, a dedicated console controller might consist of only a button and a joystick. Another may feature a dozen buttons and one or more joysticks. Early personal computer games often needed a keyboard for game play, or more commonly, required the user to buy a separate joystick with at least one button. Many modern computer games allow, or even require, the player to use a keyboard and mouse simultaneously.

Video games typically also use other ways of providing interaction and information to the player. Audio is almost universal, using sound reproduction devices, such as speakers and headphones. Other feedback may come via haptic peripherals, such as vibration or force feedback, with vibration sometimes used to simulate force feedback.

A Global Positioning System (GPS) is a space-based global navigation satellite system (GNSS) that provides reliable location and time information in all weather and at all times and anywhere on or near the Earth when and where there is an unobstructed line of sight to four or more GPS satellites. It is maintained by the United States government and is freely accessible by anyone with a GPS receiver.

In addition to GPS, other systems are in use or under development. The Russian GLObal NAvigation Satellite System (GLONASS) was in use by the Russian military only until it was made fully available to civilians in 2007. There are also the planned Chinese Compass navigation system and the European Union's Galileo positioning system.

A GPS receiver calculates its position by precisely timing the signals sent by GPS satellites high above the Earth. Each satellite continually transmits messages that include the time the message was transmitted, precise orbital information (the ephemeris), the general system health and rough orbits of all GPS satellites (the almanac). The receiver uses the messages it receives to determine the transit time of each message and computes the distance to each satellite. These distances along with the satellites' locations are used with the possible aid of trilateration, depending on which algorithm is used, to compute the position of the receiver. This position is then displayed, perhaps with a moving map display or latitude and longitude; elevation information may be included. Many GPS units show derived information such as direction and speed, calculated from position changes.

Three satellites might seem enough to solve for position since space has three dimensions and a position near the Earth's surface can be assumed. However, even a very small clock error multiplied by the very large speed of light—the speed at which satellite signals propagate—results in a large positional error. Therefore, receivers use four or more satellites to solve for the receiver's location and time. The very accurately computed time is effectively hidden by most GPS applications, which use only the location. A few specialized GPS applications do, however, use the time; these include time transfer, traffic signal timing, and synchronization of cell phone base stations.

Although four satellites are required for normal operation, fewer apply in special cases. If one variable is already known, a receiver can determine its position using only three satellites. For example, a ship or aircraft may have known elevation. Some GPS receivers may use additional clues or assumptions (such as reusing the last known altitude, dead reckoning, inertial navigation, or including information from the vehicle computer) to give a less accurate (degraded) position when fewer than four satellites are visible.

Google Maps provides high-resolution satellite images for most urban areas in the United States (including Hawaii, Alaska, Puerto Rico, and the U.S. Virgin Islands), Canada, and the United Kingdom, as well as parts of Australia and many other countries. The high-resolution imagery has been used by Google Maps to cover all of Egypt's Nile Valley, Sahara desert and Sinai. Google Maps also covers many cities in the English speaking areas. However, Google Maps is not solely an English maps service, since its service is intended to cover the world. Google has blurred some areas for security (mostly in the United States), including the U.S. Naval Observatory area (where the official residence of the Vice President is located), and previously the United States Capitol and the White House. Other well-known government installations, including Area 51 in the Nevada desert, are visible. Not all areas on satellite images are covered in the same resolution; less populated areas usually get less detail. With the introduction of an easily pannable and searchable mapping and satellite imagery tool, Google's mapping engine prompted a surge of interest in satellite imagery. Sites were established which feature satellite images of interesting natural and man-made landmarks, including such novelties as "large type" writing visible in the imagery, as well as famous stadia and unique geological formations. Although Google uses the word satellite, most of the high-resolution imagery is aerial photography taken from aircraft flying at 800-1500 feet rather than from satellites.

SUMMARY

Video games typically take place in a predetermined location e.g., a racing game at a particular racetrack, a war game at a particular location or at a predetermined virtual location.

Conventional mechanisms such as those explained above suffer from a variety of deficiencies. One such deficiency is the lack of choices of a physical location being incorporated into a video game.

Embodiments of the invention significantly overcome such deficiencies and provide mechanisms and techniques that provide a video game incorporating a user's physical location as part of the game environment.

In a particular embodiment of a method for providing a video game including user determined location information the method includes receiving information about a location for a user of a video game. The method further includes obtaining user determined location information relating to the location selected by said user. The method additionally includes mapping the user determined location information into a video game environment wherein the user of the video game experiences objects from the users selected location while playing the video game.

Other embodiments include a computer readable medium having computer readable code thereon for providing a video game including user determined location information. The computer readable medium includes instructions for receiving information about a location for a user of a video game. The computer readable medium further includes instructions for obtaining user determined location information relating to the location selected by the user. The computer readable medium additionally includes instructions for mapping the user determined location information into a video game environment wherein the user of the video game experiences objects from the users selected location while playing the video game.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a video game including user determined location information as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a video game including user determined location information as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The presently described video game including user determined location information merges video games with location information and/or mapping technology to provide a video game experience wherein user determined location information is mapped into the video game environment such that the user experiences objects from his desired environment in the video game.

Figure 1:
FIG. 1 depicts a video game image of a user location in accordance with embodiments of the invention.

For example, if a user is playing a car racing game, he or she is able to race through the streets of his or her local neighborhood in the game. This is achieved by first obtaining user determined location information relating to a users location. In a particular example, the user is able to load information relating to the users current physical location. This may be accomplished by taking a GPS reading of the user's current physical location and a certain radius around the user location or by the user entering an address. Other sources of user determined location information relating to the users physical location, such as Google Maps, may also be used to acquire a set of user determined location information to be mapped into the video game. Once acquired, the information is mapped into the game. In this example, if the user is at a residence at 1 Sarah Lane in Maynard, Mass., user determined location information relating to Sarah Lane and the town of Maynard, Mass. is acquired (via GPS, Google Map®, Google Earth® and the like). The user determined location information is mapped into the video game such that the user can race around the streets of Maynard, Mass. In the game, as shown in FIG. 1, the user can leave the residence at 1 Sarah Lane, turn onto Route 117 and race to downtown Maynard. Upon entering the downtown area the user is able to race around the town, passing local points of interest such as Clock Tower Place, local fast food places (e.g. McDonalds®), past local stores (e.g. The Outdoor Store®) and onto Route 62. By allowing the user to experience his or her desired location in the video game, an entirely new and entertaining form of game playing is achieved.

The location information can be saved, so that the user does not have to reacquire the location information every time the user plays the game. The user can move to another location, obtain user determined location information relating to the new location of the user, and experience the racing game in the new location.

In another embodiment the user enters an address he or she wants to experience with the video game. For example, the user can enter 592 South Las Vegas Boulevard Las Vegas, Nev. and start racing his or her car by Bally's Hotel, past the Flaminco Hotel etc.

While the above description used a racing game as the video game, it should be appreciated that other games (war games, sports games, fantasy games, and the like) are also able to use the physical location specified by the user as part of the game playing experience. Also, while GPS and Google Maps were used as examples of location information, it should be understood that other types of location information could also be used to provide the same video game environment.

Figure 2:
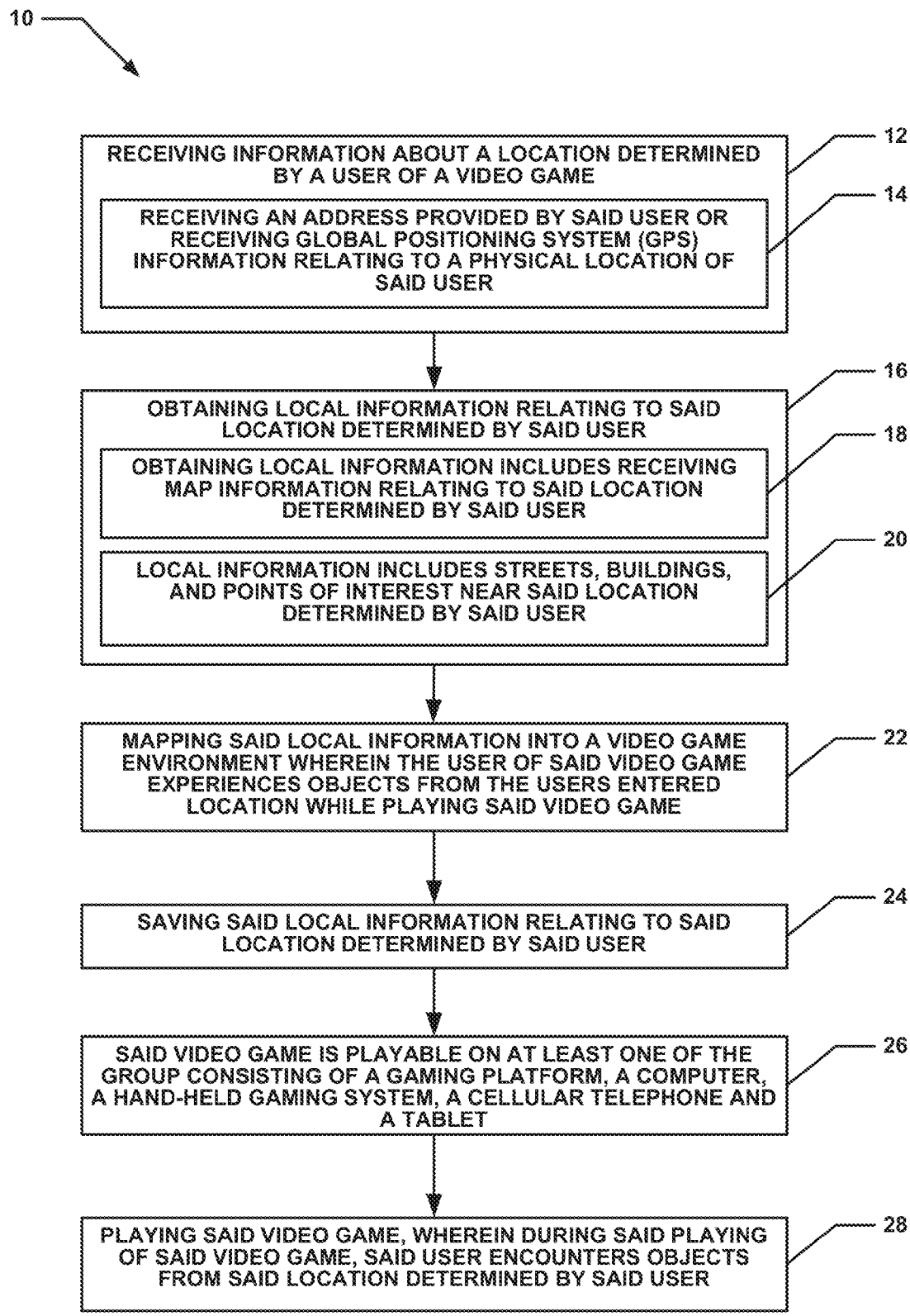
FIG. 2 illustrates a flow diagram of a particular embodiment of a method for providing a video game including user determined location information in accordance with embodiments of the invention.

Referring to FIG. 2, a flow diagram of a particular embodiment of a method 10 of providing a video game including user determined location information is presented. Method 10 begins with processing block 12 which discloses receiving information about a location for a user of a video game. Processing block 14 states the receiving information about a location for a user of a video game includes at least one of the group consisting of receiving an address provided by the user and receiving Global Positioning System (GPS) information relating to a physical location of the user.

Processing block 16 recites obtaining user determined location information relating to the location determined by the user. Processing block 18 discloses the obtaining user determined location information includes receiving map information relating to the location used by the user. Processing block 20 states wherein the user determined location information includes streets, buildings, and points of interest near the location determined by the user.

Processing continues with processing block 22 discloses mapping the user determined location information into a video game environment wherein the user of the video game experiences objects from the users entered location while playing the video game.

Processing block 24 states saving the user determined location information relating to the location determined by the user.

Processing block 26 discloses the video game is playable on at least one of the group consisting of a gaming platform, a computer, a hand-held gaming system, a cellular telephone and a tablet.

Processing block 28 states playing the video game, wherein during the playing of the video game, the user encounters objects from the location determined by the user.

Figure 3:
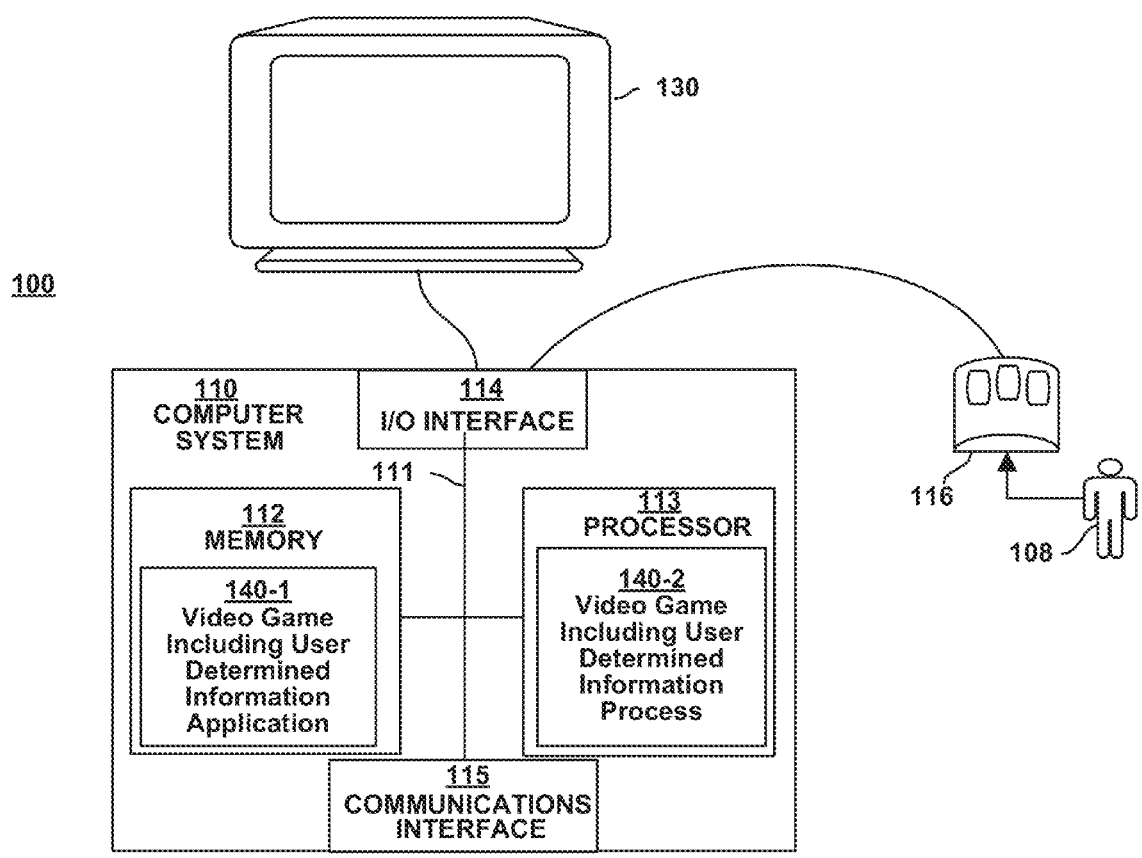
FIG. 3 illustrates an example computer system architecture for a computer system that provides a video game including user determined location information in accordance with embodiments of the invention.

FIG. 3 is a block diagram illustrating example architecture of a computer system 110 that executes, runs, interprets, operates or otherwise performs a video game incorporating user determined location information operating application 140-1 and video game incorporating user determined location information operating process 140-2 suitable for use in explaining example configurations disclosed herein. The computer system 110 may be any type of computerized device such as a personal computer, workstation, video game platform, portable computing device, console, laptop, network terminal, cellular telephone, tablet or the like.

An input device 116 (e.g., one or more customer/developer controlled devices such as a keyboard, mouse, game controller, etc.) couples to processor 113 through I/O interface 114, and enables a customer 108 to provide input commands, and generally control the graphical customer interface 160 that the video game incorporating user determined location information operating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a video game incorporating user determined location information operating application 140-1 as explained herein. The video game incorporating user determined location information operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a video game incorporating user determined location information operating application 140-1. Execution of a video game incorporating user determined location information operating application 140-1 in this manner produces processing functionality in the video game incorporating user determined location information operating process 140-2. In other words, the video game incorporating user determined location information operating process 140-2 represents one or more portions or runtime instances of a video game incorporating user determined location information operating application 140-1 (or the entire video game incorporating user determined location information operating application 140-1) performing or executing within or upon the processor 113 in the computerized device 110 at runtime.

It is noted that example configurations disclosed herein include the video game incorporating user determined location information operating application 140-1 itself (i.e., in the form of un-executed or non-performing logic instructions and/or data). The video game incorporating user determined location information operating application 140-1 may be stored on a computer readable medium (such as a floppy disk), hard disk, electronic, magnetic, optical, or other computer readable medium. A video game incorporating user determined location information operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a video game incorporating user determined location information operating application 140-1 in the processor 113 as the video game incorporating user determined location information operating process 140-2. Those skilled in the art will understand that the computer system 110 may include other processes and/or software and hardware components, such as an operating system not shown in this example.

A display 130 need not be coupled directly to computer system 110. For example, the video game incorporating user determined location information operating application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the video game incorporating user determined location information application 140-1. Execution of video game incorporating user determined location information application 140-1 produces processing functionality in video game incorporating user determined location information process 140-2. In other words, the video game incorporating user determined location information process 140-2 represents one or more portions of the video game incorporating user determined location information application 140-1 (or the entire application) performing within or upon the processor 113 in the computer system 100.

It should be noted that, in addition to the video game incorporating user determined location information process 140-2, embodiments herein include the video game incorporating user determined location information application 140-1 itself (i.e., the un-executed or non-performing logic instructions and/or data). The video game incorporating user determined location information application 140-1 can be stored on a computer readable medium such as a floppy disk, hard disk, or optical medium. The video game incorporating user determined location information application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of video game incorporating user determined location information application 140-1 in processor 113 as the video game incorporating user determined location information process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), gaming devices, or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
receiving information about a real world physical location for a user of a video game;
obtaining user determined location information relating to said real world physical location determined by said user, said user determined location information comprising continuous pre-recorded actual video of said real world physical location and of an area surrounding said real world physical location; and
mapping said user determined location information into a video game environment wherein the user of said video game experiences objects from the entered real world physical location, wherein said user traverses said video game environment while playing said video game, wherein said user of said video game is stationary in said real world and wherein all images acquired from said continuous pre-recorded actual video remains exactly as presented in the real physical world into the video game.

2. The method of claim 1 wherein said receiving information about a real world physical location for a user of a video game includes at least one of a group consisting of receiving an address provided by said user and receiving Global Positioning System (GPS) information relating to a physical location of said user.

3. The method of claim 1 further comprising saving said user determined location information relating to said real world physical location determined by said user.

4. The method of claim 1 wherein said user determined location information includes streets, buildings, and points of interest near said real world physical location used by said user.

5. The method of claim 1 wherein said video game is playable on at least one of a group consisting of a gaming platform, a computer, a hand-held gaming system, a cellular telephone and a tablet.

6. The method of claim 1 further comprising playing said video game, wherein during said playing of said video game, said user encounters objects from said real world physical location determined by said user.

7. The method of claim 1 wherein said user also encounters objects that are not part of said continuous pre-recorded actual video of said real world physical location.

8. A non-transitory computer readable storage medium having computer readable code thereon for a video game including local content, the medium including instructions in which a computer system performs operations comprising:
receiving information about a real world physical location for a user of a video game;
obtaining user determined location information relating to said real world physical location determined by said user, said user determined location information comprising continuous pre-recorded actual video of said real world physical location and of an area surrounding said real world physical location; and
mapping said user determined location information into a video game environment wherein the user of said video game experiences objects from the users entered real world physical location, wherein said user traverses said video game environment while playing said video game, wherein said user of said video game is stationary in said real world, and wherein all images acquired from said continuous pre-recorded actual video remains exactly as presented in the real physical world into the video game.

9. The computer readable storage medium of claim 8 wherein said instructions for receiving information about a real world physical location for a user of a video game includes at least one of a group consisting of receiving an address provided by said user and receiving Global Positioning System (GPS) information relating to a physical location of said user.

10. The computer readable storage medium of claim 8 further comprising instructions for saving said user determined location information relating to said real world physical location determined by said user.

11. The computer readable storage medium of claim 8 wherein said user determined location information includes streets, buildings, and points of interest near said real world physical location determined by said user.

12. The computer readable storage medium of claim 8 wherein said video game is playable on at least one of a group consisting of a gaming platform, a computer, a hand-held gaming system, a cellular telephone and a tablet.

13. The computer readable storage medium of claim 8 further comprising instructions for playing said video game, wherein during said playing of said video game, said user encounters objects from said real world physical location determined by said user.

14. The computer readable storage medium of claim 8 further comprising instructions wherein said user also encounters objects that are not part of said continuous pre-recorded actual video of said real world physical location.

15. A computer system comprising:
a memory;
a processor;
a communications interface;
an interconnection mechanism coupling the memory, the processor and the communications interface; and
wherein the memory is encoded with an application providing a video game including local content, that when performed on the processor, provides a process for processing information, the process causing the computer system to perform the operations of:
receiving information about a real world physical location for a user of a video game;
obtaining user determined location information relating to said real world physical location determined by said user, said user determined location information comprising continuous pre-recorded actual video of said real world physical location and of an area surrounding said real world physical location; and
mapping said user determined location information into a video game environment wherein the user of said video game experiences objects from the users entered real world physical location, wherein said user traverses said video game environment while playing said video game, wherein said user of said video game is stationary in said real world and wherein all images acquired from said continuous pre-recorded actual video remains exactly as presented in the real physical world into the video game.

16. The computer system of claim 15 wherein said receiving information about a location for a user of a video game includes at least one of the group consisting of receiving an address provided by said user and receiving Global Positioning System (GPS) information relating to a physical location of said user.

17. The computer system of claim 15 further comprising performing an operation of saving said user determined location information relating to said real world physical location determined by said user.

18. The computer system of claim 15 wherein said user determined location information includes streets, buildings, and points of interest near said real world physical location determined by said user.

19. The computer system of claim 15 wherein said computer system is selected from a group consisting of a gaming platform, a computer, a hand-held gaming system, a cellular telephone and a tablet.

20. The computer system of claim 15 wherein said user also encounters objects that are not part of said continuous pre-recorded actual video of said real world physical location.

\* \* \* \* \*